United States Patent
Tanaka et al.

(10) Patent No.: US 6,632,871 B1
(45) Date of Patent: Oct. 14, 2003

(54) CROSSLINKABLE ELASTOMER COMPOSITION, SEALING MATERIAL PRODUCED FROM SAID COMPOSITION AND FILLER USED THEREFOR

(75) Inventors: Hiroyuki Tanaka, Settsu (JP); Masanori Hasegawa, Settsu (JP); Tsuyoshi Noguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/743,707

(22) PCT Filed: Jul. 14, 1999

(86) PCT No.: PCT/JP99/03791

§ 371 (c)(1), (2), (4) Date: Jan. 16, 2001

(87) PCT Pub. No.: WO00/04084

PCT Pub. Date: Jan. 27, 2000

(30) Foreign Application Priority Data

Jul. 17, 1998 (JP) ............................................. 10-203843

(51) Int. Cl.[7] ............................. C08K 3/22; C08C 19/22
(52) U.S. Cl. ....................... 524/497; 525/378; 525/379; 525/387
(58) Field of Search ................... 524/80, 497; 525/378, 525/379, 387

(56) References Cited

FOREIGN PATENT DOCUMENTS

| EP | 0 444 798 | * | 9/1991 |
|---|---|---|---|
| EP | 0 444 798 A2 | | 9/1991 |
| GB | 1 277 378 | * | 6/1972 |
| JP | 63-107809 | | 5/1988 |
| JP | 63-156011 | | 6/1988 |
| JP | 63-233016 | | 9/1988 |
| JP | 1-213362 | | 8/1989 |
| JP | 4-48759 | | 2/1992 |
| JP | 9-268008 | | 10/1997 |

* cited by examiner

*Primary Examiner*—Robert D. Harlan
(74) *Attorney, Agent, or Firm*—Sughrue Mion, PLLC

(57) ABSTRACT

The metal oxide filler of titanium oxide or silicon oxide for the crosslinkable elastomer composition which has a pH value of from 5.0 to 11.0 and contains impurity metals other than the essential metal of the filler in an amount of not more than 10,000 ppm. The metal oxide filler can be obtained by extraction treatment of a starting metal oxide filler with an acid to reduce a content of impurity metals thereof and then treatment with an alkali to neutralize a remaining acid. The metal oxide filler of the present invention does not cause a crosslinking failure even when added to the elastomer composition and can provide the elastomer molded article suitable as a very clean sealing material for semi-conductor production apparatuses.

9 Claims, No Drawings

CROSSLINKABLE ELASTOMER COMPOSITION, SEALING MATERIAL PRODUCED FROM SAID COMPOSITION AND FILLER USED THEREFOR

TECHNICAL FIELD

The present invention relates to a clean crosslinkable elastomer composition which can give a sealing material to be used for sealing of semi-conductor production apparatuses, and the like and to a metal oxide filler which is mixed to the composition and has a reduced impurity metal content.

BACKGROUND ART

In producing semiconductor elements, very high cleanliness is required, and the requirements for high cleanliness range over not only management of a production process of semiconductors but also semiconductor production apparatuses and parts thereof. If the parts of semiconductor production apparatuses are cleaned after built in the apparatuses, a degree of possible cleanliness is limited. Such parts are required to have been cleaned highly before built in the apparatuses. In production of semiconductors, there are problems with contamination, particularly micro particles so-called particles, organic additives and elution of metals, which have an adverse effect on accurate etching treatment.

Also cleanliness is required similarly in a sealing material for semiconductor production apparatuses which the present invention can be particularly suitably applied to. The applicant of the present invention has attained high cleanliness of the sealing material itself by employing special methods of cleaning the sealing material after molding (Japanese Patent Application No. 77781/1998).

Such a sealing material has been produced by vulcanizing and molding a crosslinkable elastomer composition such as a rubber, and in order to impart mechanical properties, there is a case where a metal oxide filler such as titanium oxide or silica is added to the composition.

For cleaning a sealing material containing a metal oxide filler, particularly for removing impurity metals, the above-mentioned methods such as a method of extraction of impurity metals by washing the sealing material after molding with an acid and a method of adding a filler cleaned by washing with an acid can be considered. The present invention relates to the latter method of cleaning a filler itself In that case, after adding the filler to an elastomer composition, the composition has to be crosslinked and molded. However when usual relatively clean fillers were used, peroxide crosslinking which was a generally employed crosslinking method could not be carried out. Namely when the peroxide crosslinking is tried, those fillers cause crosslinking failure which not only lowers mold-processability but also has an adverse effect on properties of molded article such as compression set, tensile strength and modulus.

DISCLOSURE OF INVENTION

An object of the present invention is to provide a metal oxide filler which has a reduced impurity metal content and does not cause crosslinking failure even if not only radiation crosslinking but also peroxide crosslinking is carried out.

Also an object of the present invention is to provide a crosslinkable elastomer composition which contains the metal oxide filler and can be subjected to not only radiation crosslinking but also peroxide crosslinking.

Further the present invention relates to a sealing material obtained by crosslinking and molding the above-mentioned composition.

Namely the metal oxide filler of the present invention has a content of impurity metals other than essential metal of the filler in an amount of not more than 10,000 ppm. Preferably pH is adjusted to 5.0 to 11.0. It is preferable that the essential metal is at least one of titanium, silicon, cobalt, iron, aluminum, chromium, zinc, tungsten and molybdenum.

The metal oxide filler having a reduced content of impurity metals can be obtained by extraction treatment of a starting metal oxide filler with an acid to reduce a content of impurity metals in the metal oxide filler and then treatment with an alkali to neutralize the remaining acid.

The crosslinkable elastomer composition obtainable by adding the metal oxide filler of the present invention to a fluorine-containing elastomer component or silicone-based elastomer component can be crosslinked and molded without causing a crosslinking failure and can give a sealing material having excellent mechanical properties. Then the sealing material is subjected to treatment by a special cleaning method described in the above-mentioned Japanese Patent Application No. 77781/1998, namely a cleaning method with ultra pure water, a method of cleaning with a clean organic compound in the form of liquid at a washing temperature or a clean inorganic aqueous solution, a cleaning method by dry etching or an extraction cleaning method, and thereby a highly cleaned sealing material for semiconductor production apparatuses can be obtained.

BEST MODE FOR CARRYING OUT THE INVENTION

In the present invention, the metal oxide encompasses a metal oxide comprising one metal and in addition, a composite metal oxide containing two or more metals and a metal hydroxide transformable to a metal oxide. It is preferable that the metal oxide comprises at least one metal such as titanium, silicon, cobalt, iron, aluminum, chromium, zinc, tungsten or molybdenum. Impurity metals to be extracted and removed mean metals other than essential metal of the metal oxide. It is preferable that particularly alkali metals such as sodium, potassium and lithium, copper, nickel and the like are not present from the viewpoint that they lower yield of semi-conductor elements.

Examples of the metal oxide are metal oxides comprising a single metal such as $TiO_2$, $SiO_2$, $Co_3O_4$, $Al_2O_3$, $WO_3$, $Cr_2O_3$, $ZnO$, $MoO_3$ or $Fe_2O_3$; and composite metal oxides thereof. From the viewpoint of excellent reinforcing effect, $TiO_2$, $SiO_2$, $Al_2O_3$, $Cr_2O_3$ and $ZnO$ are preferable, and particularly preferable are $TiO_2$ and $SiO_2$. In case of oxides of metals, fluorides of which have sublimation property, for example, $SiO_2$, $MoO_3$, $WO_3$, and the like, even if they are dropped off after a molded article is equipped on semiconductor production apparatuses, it is assumed that they are transformed to fluorides by fluorine radical generated at plasma etching and sublimed. Thus there is a merit that they do not become micro particles.

An average particle size of the metal oxide of the present invention is from about 0.05 μm to about 10.0 μm, preferably 0.1 to 5.0 μm, more preferably not more than 1.0 μm.

A content of impurity metals other than the essential metal of the metal oxide filler of the present invention is not more than 10,000 ppm, preferably not more than 7,000 ppm, more preferably not more than 5,000 ppm, especially not more than 3,000 ppm, most preferably not more than 1,000 ppm. Reduction of impurity metals may be carried out by treating a starting metal oxide with an acid such as sulfuric acid, nitric acid, hydrofluoric acid, hydrochloric acid, or the like to extract impurity metals.

Among commercially available $TiO_2$, there are those merely treated with an acid to reduce a metal content. For example, high grade titanium oxides such as TP-2 and TP-3 available from Fuji Titanium Kogyo Kabushiki Kaisha are known. When they are mixed to a crosslinkable elastomer composition and peroxide crosslinking is carried out, a crosslinking failure arises. In the present invention, those commercially available high grade titanium oxides can be used as a starting metal oxide.

In the present invention, not to cause a crosslinking failure even if a metal oxide is mixed to a crosslinkable elastomer composition, the metal oxide is subjected to not only acid treatment but also treatment for neutralizing the acid being present on the acid-treated metal oxide since the acid causes a peroxide crosslinking failure. The neutralizing treatment may be carried out by using an alkali. It is preferable to avoid use of an alkali containing metals from the viewpoint of reduction of contamination sources. Examples of the preferred alkali are, for instance, aqueous ammonia, basic amines such as triethanolamine, triethylamine and diethylamine, ammonia gas, and the like. Particularly from the viewpoint of handling property, separation and removal, aqueous ammonia having a concentration of 1 to 28% by weight is preferable. By the neutralizing treatment, a pH value which is 2.0 to 4.0 after the acid treatment is increased to 5.0 to 11.0. A preferred pH is 5.0 to 9.0.

The neutralizing treatment is easily carried out by dipping in an alkaline solution. Also a method of spraying an alkaline solution may be used.

It is further preferable that after the neutralizing treatment, washing with a clean chemical solution such as ultra pure water is carried out to remove generated salt and remaining micro particles.

The metal oxide filler subjected to neutralizing treatment and washing is separated and dried. It is preferable to carry out the drying in a clean atmosphere such as a clean gas. Examples of the preferably used clean gas are, for instance, high purity inert gases such as nitrogen gas, helium gas and argon gas. It is preferable that the drying is carried out by pre-drying at 50° to 150° C. for 5 to 24 hours and further heating at 200° to 300° C. for 1 to 24 hours.

In addition to the above-mentioned method, the neutralizing treatment may be carried out by a method of merely washing with a clean chemical solution such as ultra pure water or a method of exposing to ammonia gas. Examples of the clean chemical solution to be used preferably are ultra pure water which has a metal content of not more than 1.0 ppm and does not contain micro particles of not less than 0.2 $\mu$tm in an amount of more than 300 per 1 ml and an organic compound in the form of liquid at a washing temperature or inorganic aqueous solution which has a metal content of not more than 1.0 ppm and does not contain micro particles of not less than 0.5 $\mu$m in an amount of more than 200 per 1 ml.

The clean metal oxide filler of the present invention is added to the crosslinkable elastomer composition. An adding amount thereof is 1 to 150 parts by weight (hereinafter referred to as "part"), preferably 1 to 80 parts on the basis of 100 parts of the elastomer component. When much amount of the filler is added, an amount of dropped-off filler increases, which easily causes generation of micro particles.

The elastomer component is not limited particularly. When it is used as a starting material for a sealing material for semi-conductor production apparatuses, a fluorine-containing elastomer and silicone elastomer are preferable.

Examples of the fluorine-containing elastomer are, for instance, as follows. Perfluoro elastomer comprising 40 to 90% by mole of tetrafluoroethylene, 10 to 60% by mole of perfluoro(vinyl ether) represented by the formula (1):

$$CF_2=CF-OR_f$$

wherein $R_f$ is a perfluoroalkyl group having 1 to 5 carbon atoms or a perfluoroalkyl(poly)ether group having 3 to 12 carbon atoms and 1 to 3 oxygen atoms, and 0 to 5% by mole of a monomer giving a curing moiety. Vinylidene fluoride elastomer comprising 30 to 90% by mole of vinylidene fluoride, 15 to 40% by mole of hexafluoropropylene and 0 to 30% by mole of tetrafluoroethylene. Thermoplastic perfluoro elastomer which is a fluorine-containing multi-segment polymer comprising an elastomeric fluorine-containing polymer chain segment and a non-elastomeric fluorine-containing polymer chain segment, in which the elastomeric fluorine-containing polymer chain segment comprises 40 to 90% by mole of tetrafluoroethylene, 10 to 60% by mole of perfluoro(vinyl ether) represented by the formula (1):

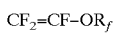

$$CF_2=CF-OR_f$$

wherein $R_f$ is a perfluoroalkyl group having 1 to 5 carbon atoms or a perfluoroalkyl(poly)ether group having 3 to 12 carbon atoms and 1 to 3 oxygen atoms, and 0 to 5% by mole of a monomer giving a curing moiety, and the non-elastomeric fluorine-containing polymer chain segment comprises 85 to 100% by mole of tetrafluoroethylene and 0 to 15% by mole of a compound represented by the formula (2):

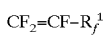

$$CF_2=CF-R_f^1$$

wherein $R_f^1$ is $CF_3$ or $OR_f^2$, in which $R_f^2$ is a perfluoroalkyl group having 1 to 5 carbon atoms. Fluorine-containing multi-segment polymer comprising an elastomeric fluorine-containing polymer chain segment and a non-elastomeric fluorine-containing polymer chain segment, in which the elastomeric fluorine-containing polymer chain segment contains recurring units derived from 45 to 85% by mole of vinylidene fluoride and at least one other monomer copolymerizable with vinylidene fluoride, respectively. Examples of the other monomer are hexafluoropropylene, tetrafluoroethylene, chlorotrifluoroethylene, trifluoroethylene, trifluoropropylene, tetrafluoropropylene, pentafluoropropylene, trifluorobutene, tetrafluoroisobutene, perfluoro(alkyl vinyl ether), vinyl fluoride, ethylene, propylene, alkylvinylether, and the like. Cold resistant fluorine-containing elastomer prepared by radical polymerization in the presence of a di-iodine compound and comprising 0.005 to 1.5% by mole of iodine-containing fluorinated vinyl ether unit, 40 to 90% by mole of vinylidene fluoride unit and 3 to 35% by mole of perfluoro(methyl vinyl ether) unit (as case demand, hexafluoropropylene unit of up to 25% by mole and/or tetrafluoroethylene unit of up to 40% by mole may be contained) (JP-A-8-15753). Copolymer comprising tetrafluoroethylene and propylene (U.S. Pat. No. 3467635).

Examples of the preferred silicone elastomer are, for instance, silicone rubber, fluoro silicone rubber, and the like.

The elastomer composition can be crosslinked and molded into desired forms of products. As a crosslinking method, though peroxide crosslinking is usual, crosslinking by irradiating radioactive rays and electron beams may be used.

When carrying out organic peroxide crosslinking, to 100 parts of the elastomer component are added an organic peroxide in an amount of from 0.05 to 10 parts, preferably 0.1 to 2.0 parts and a crosslinking aid in an amount of from 0. 1 to 10 parts, preferably 0.3 to 5.0 parts. In addition, a processing aid, internal mold releasing agent, and the like may be added. The organic peroxide crosslinking can be carried out by usual method, and there arise no crosslinking failure as occurred before.

The crosslinkable elastomer composition of the present invention can be used suitably for a sealing material, particularly for production of a sealing material for sealing of semiconductor production apparatuses, in which high cleanliness is demanded. Examples of the sealing material are O-ring, gasket, packing, oil seal, bearing seal, lip seal, and the like.

In addition, the crosslinkable elastomer composition can be used for a variety of elastomer products, for example, diaphragm, tube, hose, various rolls, and the like.

The present invention is then explained by means of examples, but is not limited to them.

PREPARATION EXAMPLE 1

100 Gram of high grade titanium oxide (TP-3 available from Fuji Titanium Kogyo Kabushiki Kaisha, contents of impurity metals: 240 ppm of sodium and 27 ppm of potassium, average particle size: 0.42 μm, pH: 4.0) was dispersed in 300 ml of 10% by weight of aqueous ammonia, followed by neutralizing treatment at room temperature for one hour with stirring. The obtained treated titanium oxide was filtrated and separated through a polytetrafluoroethylene filter and washed with 2,000 ml of ultra pure water. Then the titanium oxide was pre-dried at 120° C. for ten hours in a clean dryer, and further dried at 250° C. for five hours to give the metal oxide filler of the present invention. A pH value and contents of impurity metals were measured by the following methods. As a result, pH was 5.3, and contents of impurity metals Na and K were 200 ppm and 25 ppm, respectively. (pH)

3 Gram of metal oxide filler was dispersed in 30 ml of ultra pure water, and subjected to stirring at room temperature for ten hours with a magnetic stirrer. Then a pH value of the ultra pure water was measured with a pH meter. (Contents of impurity metals)

0.1 Gram of metal oxide filler was put in a platinum crucible and dispersed and dissolved in 5 ml of 50% hydrofluoric acid in a hot bath, followed by diluting with ultra pure water. Metal contents of the solution were determined through atomic absorption analysis with an atomic absorption spectron photometer (Z8000 available from Hitachi, Ltd.). Metals intended to measure were Na, K and Cu. The contents of each metal in the filler were calculated by the following equation.

$$\begin{pmatrix} \text{Metal content} \\ (\% \text{ by weight}) \end{pmatrix} = \frac{\begin{pmatrix} \text{Concentration in solution} \\ (\% \text{ by weight}) \end{pmatrix}}{\text{Weight of filler}} \times \text{Weight of solution (g)}$$

(g)

PREPARATION EXAMPLE 2

100 Gram of silicon oxide (Carplex #1120 available from Shionogi & Co., Ltd., impurity metals: 27,000 ppm of sodium and 830 ppm of potassium, average particle size: 35 μm, pH: 10.5) was dispersed in 300 ml of 5% by weight of sulfuric acid, and acid-treated at room temperature for one hour with stirring. The obtained treated silicon oxide was filtrated through a filter and washed with 2,000 ml of ultra pure water. Then the silicon oxide was pre-dried at 120° C. for ten hours, and further dried at 250° C. for five hours to reduce impurity metal contents (Na: 320 ppm, K: 45 ppm). The treated silicon oxide (pH: 4.3) was dispersed in 300 ml of 10% by weight of aqueous ammonia and subjected to neutralizing treatment at room temperature for one hour with stirring. The obtained treated silicon oxide was filtrated and separated through a polytetrafluoroethylene filter and washed with 2,000 ml of ultra pure water. Then the silicon oxide was pre-dried at 120° C. for ten hours in a clean dryer, and further dried at 250° C. for five hours to give the metal oxide filler of the present invention. A pH value and contents of impurity metals were measured by the methods described in Preparation Example 1. As a result, pH was 10.2, and contents of impurity metals Na and K were 320 ppm and 40 ppm, respectively.

EXAMPLE 1

To 100 g of tetrafluoroethylene/perfluoro(alkyl vinyl ether) copolymer elastomer were kneaded 50 g of titanium oxide filler of the present invention obtained in Preparation Example 1, 1 g of 2,5-dimethyl-2,5-di(t-butylperoxy)hexane (PERHEXA 25B available from NOF Corporation) and 3 g of triallylisocyanurate (TAIC) to give the elastomer composition of the present invention, and vulcanization characteristics thereof at 160° C. (minimum viscosity, maximum viscosity, induction period, vulcanization time) were measured with JSR Curastometer Model II (available from Nichigo Shoji Kabushiki Kaisha). The results are shown in Table 1. Then the elastomer composition was molded into O-ring by compression molding at 160° C. for 10 minutes, followed by secondary vulcanization at 180° C. for four hours.

EXAMPLE 2

To 100 g of tetrafluoroethylene/perfluoro(alkyl vinyl ether) copolymer elastomer were kneaded 15 g of silicon oxide filler of the present invention obtained in Preparation Example 2, 1 g of PERHEXA 25B and 3 g of TAIC to give the elastomer composition of the present invention, and vulcanization characteristics thereof were measured in the same manner as in Example 1. The results are shown in Table 1. Then the elastomer composition was molded into O-ring by compression molding, followed by secondary vulcanization.

COMPARATIVE EXAMPLE 1

To 100 g of tetrafluoroethylene/perfluoro(alkyl vinyl ether) copolymer elastomer were kneaded 50 g of high grade titanium oxide filler used as a starting material in Preparation Example 1, 1 g of PERHEXA 25B and 3 g of TAIC to give the elastomer composition for comparison, and vulcanization characteristics thereof at 160° C. were measured with JSR Curastometer Model II. The results are shown in Table 1. As shown in Table 1, crosslinking failure arose, and the composition was not in a state of being capable of giving a molded article.

TABLE 1

|  | Ex. 1 | Ex. 2 | Com. Ex. 1 |
|---|---|---|---|
| Minimum viscosity (kgf) | 0.17 | 0.23 | 0.15 |
| Maximum viscosity (kgf) | 5.72 | 6.45 | 0.18 |
| Induction period (min) | 0.9 | 0.7 | — |
| Vulcanizing time (min) | 3.3 | 1.9 | — |

INDUSTRIAL APPLICABILITY

The metal oxide filler of the present invention does not cause crosslinking failure even when added to the elastomer composition and can provide the elastomer molded article suitable as a very clean sealing material for semi-conductor production apparatuses.

What is claimed is:

1. A process for preparing a metal oxide filler for a crosslinkable elastomer composition containing impurity metals other than essential metal of the filler in an amount of not more than 10,000 ppm, wherein a starting metal oxide filler is subjected to extraction treatment with an acid to reduce a content of impurity metals thereof and then treated with an alkali selected from the group consisting of an aqueous ammonia, basic amine and ammonia gas to neutralize a remaining acid.

2. The process for preparing the metal oxide filler of claim 1, wherein after neutralizing treatment the metal oxide filler obtained by separation is dried in a clean atmospheric gas.

3. A crosslinkable elastomer composition comprising a metal oxide filler containing impurity metals other than essential metal of the filler in an amount of not more than 10,000 ppm and a crosslinkable elastomer component.

4. The crosslinkable elastomer composition of claim 3, wherein the metal oxide filler has a pH value adjusted to 5.0 to 11.0.

5. The crosslinkable elastomer composition of claim 3, wherein the essential metal is at least one of titanium, silicon, iron, cobalt, aluminum, chromium, zinc, tungsten and molybdenum.

6. The crosslinkable elastomer composition of claim 3, which comprises 100 parts by weight of said elastomer component and 1 to 150 parts by weight of said metal oxide filler.

7. The crosslinkable elastomer composition of claim 6, which contains 0.05 to 10 parts by weight of an organic peroxide and 0.1 to 10 parts by weight of a crosslinking aid.

8. A sealing material obtained by crosslinking and molding the elastomer composition of claim 3.

9. The sealing material of claim 8, which is used for sealing of semi-conductor production apparatuses.

* * * * *